United States Patent [19]
Mitsui et al.

[11] Patent Number: 5,183,714
[45] Date of Patent: Feb. 2, 1993

[54] BATTERY CASING

[75] Inventors: Hidero Mitsui, Kanagawa; Naoki Kamaya, Tokyo; Hiroaki Itoh; Yuu Sasaki, both of Chiba, all of Japan

[73] Assignee: Sony Corporation, Japan

[21] Appl. No.: 762,405

[22] Filed: Sep. 19, 1991

[30] Foreign Application Priority Data

Oct. 9, 1990 [JP] Japan .................. 2-272028

[51] Int. Cl.[5] .......................................... H01M 10/38
[52] U.S. Cl. .................................... 429/123; 429/178; 429/176
[58] Field of Search ............... 429/65, 48, 123, 1, 429/121, 96, 97, 163, 178

[56]  References Cited

U.S. PATENT DOCUMENTS

| | | | |
|---|---|---|---|
| 4,129,688 | 12/1978 | Fischer et al. | 429/123 X |
| 4,399,201 | 8/1983 | Nagahara | 429/48 |
| 4,515,872 | 5/1985 | Okano | 429/65 |
| 4,714,439 | 12/1987 | Marabotto et al. | 429/123 X |

FOREIGN PATENT DOCUMENTS 2728429  1/1978  Fed. Rep. of Germany .
57-1111  1/1982  Japan .

*Primary Examiner*—Anthony Skapars
*Attorney, Agent, or Firm*—Ronald P. Kananen

[57]  ABSTRACT

A battery casing for attachment on an electric equipment having positive and negative terminal rods. The battery casing comprises positive and negative terminal plates exposed for connection to the respective terminal rods when the battery casing is attached on the electric equipment. The battery casing also includes a shutter mechanism for covering at least one of the terminal plates. The shutter mechanism uncovers the one terminal plate in response to movement of the corresponding one of the terminal rods during the course of attachment of the battery casing on the electric equipment so as to permit the one terminal rod to come into contact with the one terminal plate.

8 Claims, 6 Drawing Sheets

BATTERY CASING

BACKGROUND OF THE INVENTION

This invention relates to a battery casing for use with an electric equipment such as a video camera or the like.

Some electric equipments are designed to have a battery casing removably attached thereon. The battery casing has positive and negative battery terminal plates exposed for connection to the positive and negative terminal rods provided on the side of the electric equipment. If the battery casing is removed from the electric equipment and carried in a handbag or bag, a metallic necklace, a metallic brooch or other conductive articles carried in the bag would make an electric connection between the positive and negative terminal plates to short the battery contained in the battery casing. The short circuit results in a waste of electric power and a heat generation which may be a cause of a scald and fire.

SUMMARY OF THE INVENTION

Therefore, it is a main object of the invention to provide an improved battery casing which is free from a short circuit.

There is provided, in accordance with the invention, a battery casing for attachment on an electric equipment having positive and negative terminal rods. The battery casing comprises positive and negative terminal plates exposed for connection to the respective terminal rods when the battery casing is attached on the electric equipment. The battery casing also includes means for covering at least one of the terminal plates. The means uncovers the one terminal plate in response to movement of the corresponding one of the terminal rods during the course of attachment of the battery casing on the electric equipment so as to permit the one terminal rod to come into contact with the one terminal plate.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 10:
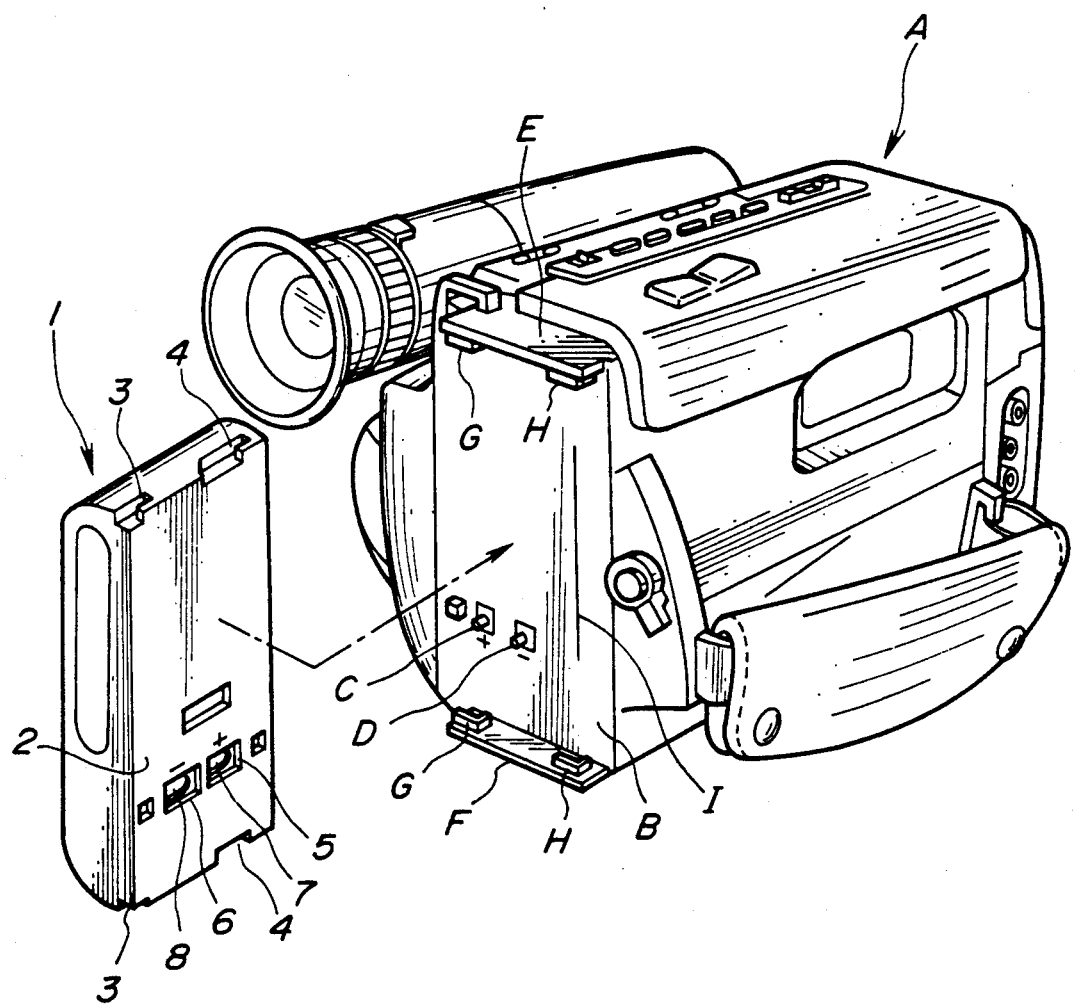
FIG. 10 is a perspective view showing a conventional battery casing with a video camera.

Prior to the description of the preferred embodiments of the invention, the prior art battery casing of FIG. 10 is briefly described in order to provide a basis for a better understanding of the difficulties attendant thereon.

FIG. 10 shows a prior art battery casing 1 for use with a video camera A having a flat surface B from which positive and negative terminal rods C and D extend a predetermined length. The terminal rods C and D are placed for inward and outward movement in the video camera A and urged outwardly by springs (not shown) placed in the video camera A. The video camera A also has upper and lower guide members E and F arranged in spaced-parallel relation with each other. Each of the guide members E and F has a pair of projections G and H formed on its inner surface.

The battery casing 1 has a flat surface 2 for attachment to the flat surface B of the video camera A. The flat surface 2 is formed in each of the upper and lower portions thereof with a pair of recesses 3 and 4 for engagement with the respective projections G and H. The flat surface 2 has windows 5 and 6 through which positive and negative terminal plates 7 and 8 are exposed to the atmosphere.

The manner of attaching the battery casing 1 on the flat surface B of the video camera A is as follows: First of all, the flat surface 2 of the battery casing 1 is placed on the flat surface B of the video camera A with its one side being coincided with the positioning line I drawn on the flat surface B of the video camera A. The battery casing 1 is then slid on the flat surface B of the video camera A to the right, as viewed in FIG. 10, between the upper and lower guide members E and F to place the projections G and H into engagement with the respective recesses 3 and 4. At this position, the positive and negative terminal rods C and D are held in pressure contact with the respective terminal plates 7 and 8.

When the battery casing 1 is removed from the video camera A and carried in a bag or handbag, a metallic necklace, a metallic brooch or other conductive articles would come into contact with the terminal plates 7 and 8 to short the battery carried in the bag. The short circuit results in a discharge of electric power from the battery and a heat generation which may be a cause of a scald and fire.

Figure 1:
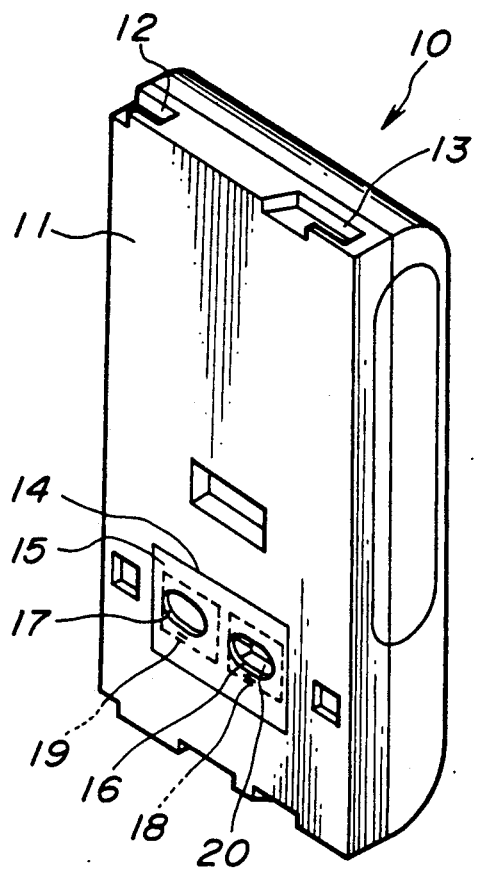
FIG. 1 is a perspective view showing one embodiment of a battery casing made in accordance with the invention.
Figure 2:
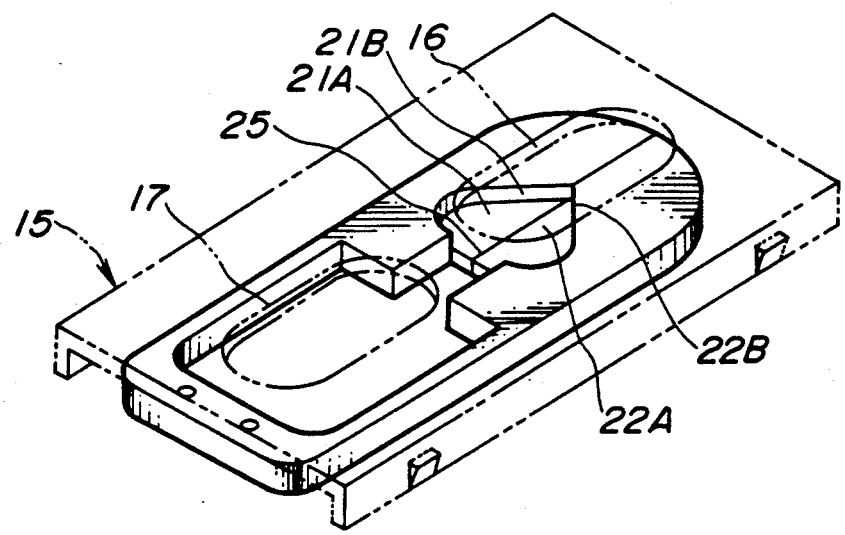
FIG. 2 is a perspective view showing the significant portion of the battery casing of FIG. 1.
Figure 3:
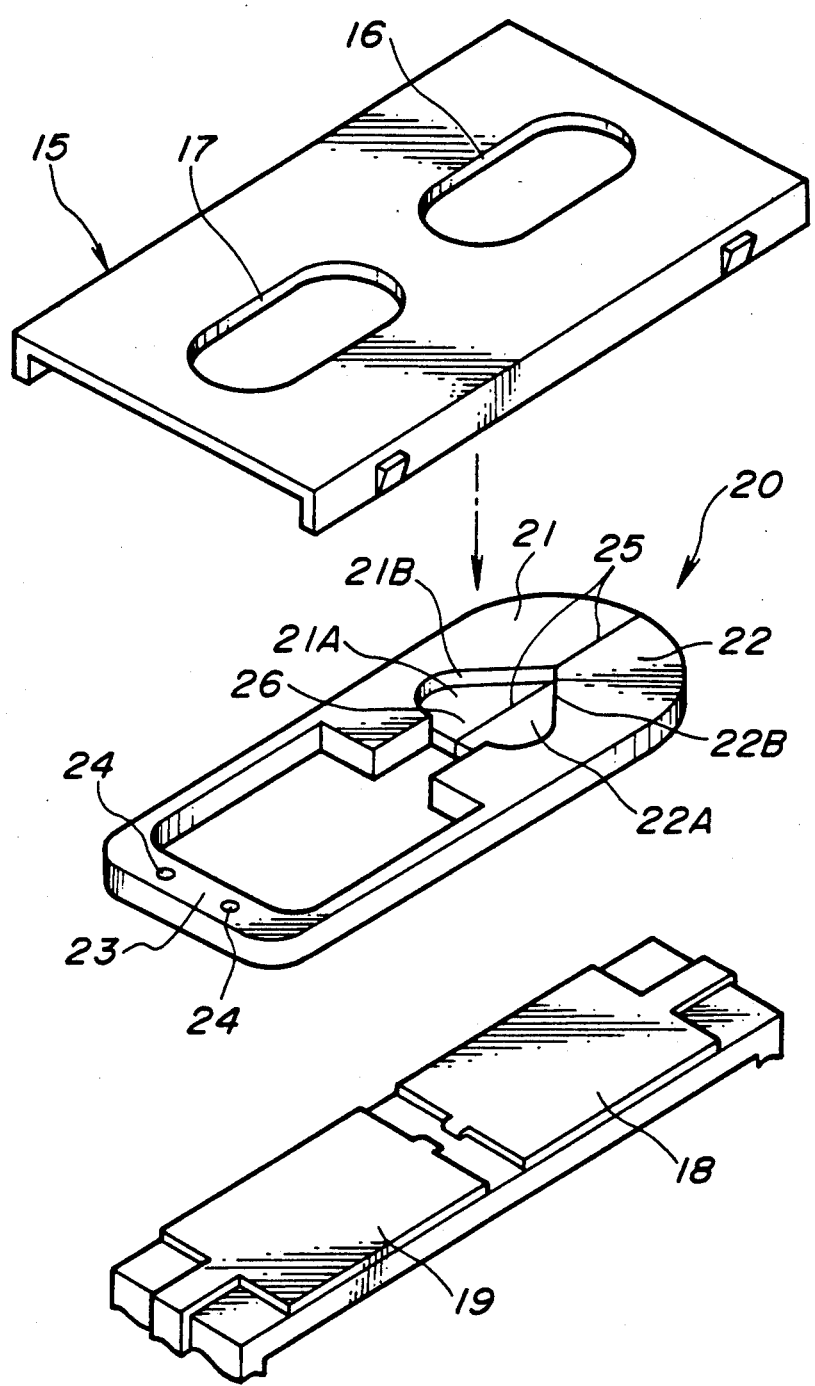
FIG. 3 is an exploded perspective view showing the significant portion of the battery casing of FIG. 1.

Referring to FIGS. 1 to 3, there is illustrated one embodiment of a battery casing made in accordance with the invention. Although the invention will be described in connection with a video camera as shown in FIG. 10, it is to be understood the invention is equally applicable to other types of battery casing.

The battery casing, generally designated by the numeral 10, has a flat surface 11 for attachment to the flat surface B of the video camera A (FIG. 10). The flat surface 11 is formed in each of the upper and lower portions thereof with a pair of recesses 12 and 13 for engagement with the respective projections E and F. The flat surface 11 has a rectangular opening 14 in which a support plate 15 is fitted. The support plate 15 is formed with windows 16 and 17 through which the positive and negative terminal plates 18 and 19 are exposed to the atmosphere.

The support plate 15 has a shutter mechanism 20 secured on the inner surface thereof. The shutter mechanism 20 is shown as an elastic one-piece member comprised of shutter elements 21 and 22 of the same configuration and a U-shaped connection 23 connected at its opposite ends to the respective shutter elements 21 and 22. The U-shaped connection 23 is placed to open the window 17 and bonded at points 24 to the inner surface of the support plate 15. The shutter mechanism 20 is normally held in a closed position where the shutter elements 21 and 22 have their facing side surfaces held in pressure contact with each other on a plane including a partition line 25, as best shown in FIG. 3, to close the window 16 by the resilient force of the U-shaped connection 23. For this purpose, the shutter mechanism 20 is made of polyvinyl acetal, polyethylene or other plastics having a high modulus of elasticity. The shutter elements 21 and 22 have recesses 21A and 22A which form a depression 26 symmetric with respect to the partition line 25 when the shutter mechanism 20 is in the closed position. The recesses 21A and 22A have respective side walls 21B and 22B inclined at an acute angle with respect to the partition line 25.

Figure 4:
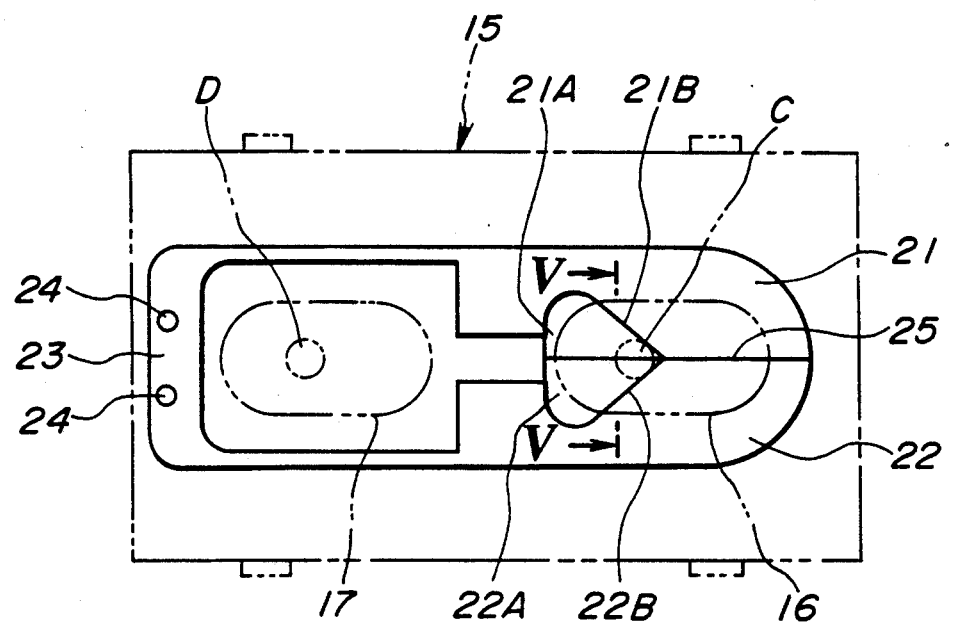
FIG. 4 is a plan view showing the shutter mechanism placed in a closed position.
Figure 5:
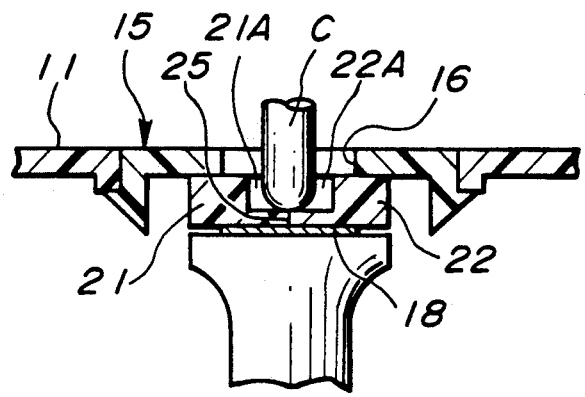
FIG. 5 is a fragmentary sectional view taken along the lines V—V of FIG. 4.
Figure 6:
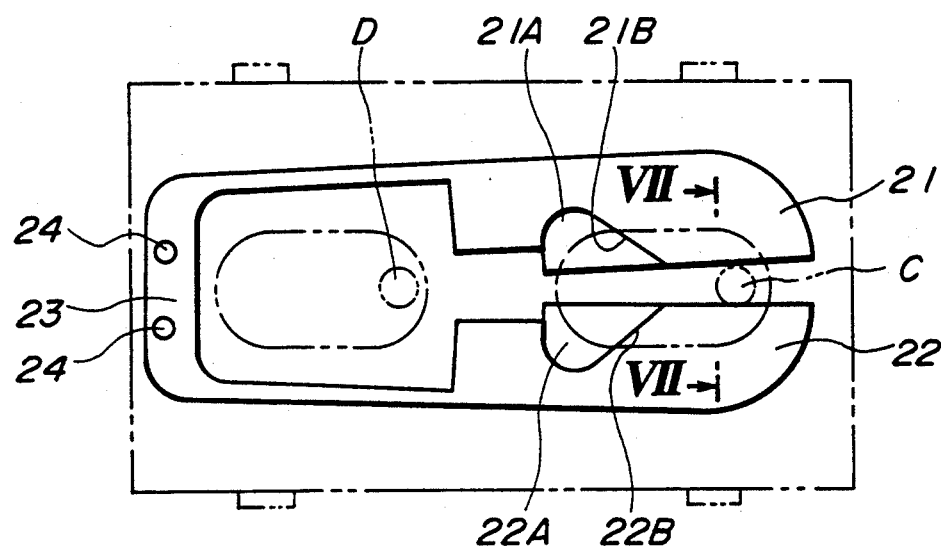
FIG. 6 is a plan view showing the shutter mechanism placed in an open position.
Figure 7:
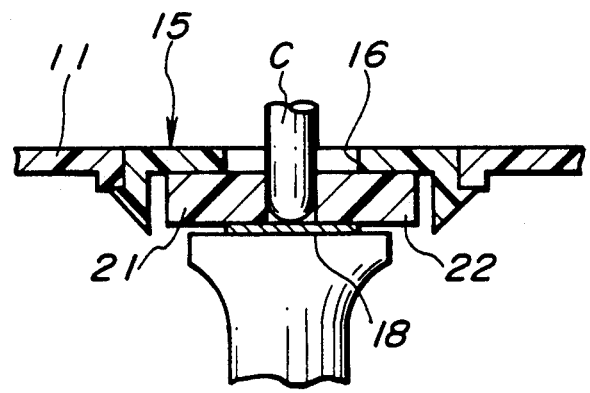
FIG. 7 is a fragmentary sectional view taken along the lines VII—VII of FIG. 6.

The manner of attaching the battery casing 10 on the video camera A is as follows: When the battery casing 10 is separated from the video camera A, the shutter mechanism 20 is in the closed position where the shutter elements 21 and 22 are in abutment with each other to close the window 16, as shown in FIG. 2. First of all, the battery casing 10 is placed on the flat surface B of the video camera A with its one side being coincided with the positioning line I drawn on the flat surface B of the video camera A. In this position, the positive terminal rod C extends through the window 16 and comes into pressure contact with the shutter elements 21 and 22 in the depression 26, as shown in FIGS. 4 and 5, under the resilient force of the spring associated with the positive terminal rod C, whereas the negative terminal rod D extends through the window 17 and comes into pressure contact with the negative terminal plate 19 under the resilient force of the spring associated with the negative terminal rod D. The battery casing 10 is then slid on the flat surface B of the video camera A to the right, as viewed in FIG. 10, between the upper and lower guide members E and F to place the projections G and H into engagement with the respective recesses 12 and 13. In the course of this sliding movement of the battery casing 10, the positive terminal rod C moves the shutter mechanism 20 to an open position, as shown in FIG. 6. That is, the positive terminal rod C moves between the side walls 21B and 22B of the respective shutter elements 21 and 22 to separate the shutter elements 21 and 22 away from each other against the resilient force of the U-shaped connection 23 and it comes into pressure contact with the positive terminal plate 18 by the resilient force of the spring associated with the positive terminal rod C, as shown in FIG. 7.

Figure 8:
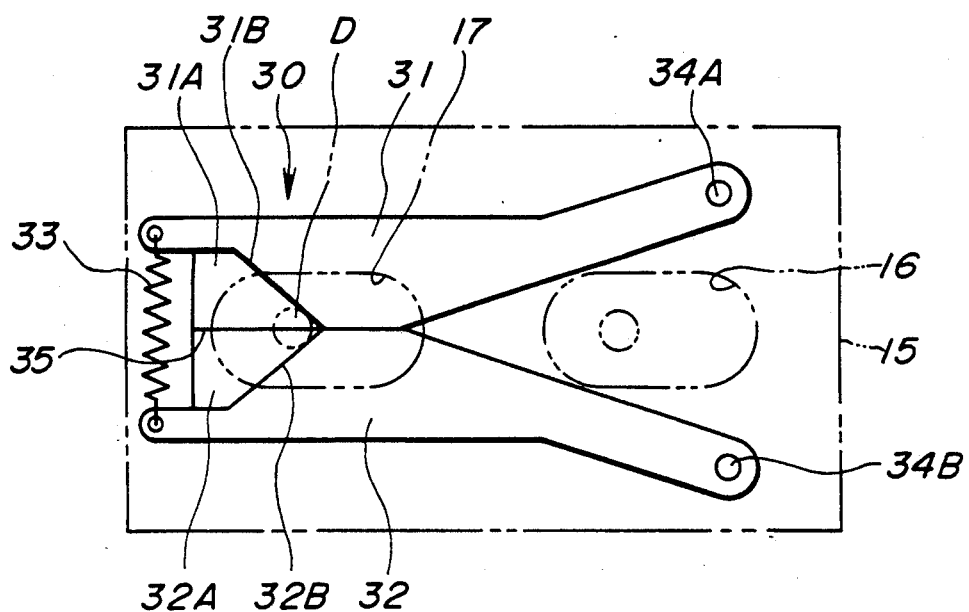
FIG. 8 is a plan view showing the shutter mechanism used in a second embodiment of the battery casing of the invention.
Figure 9:
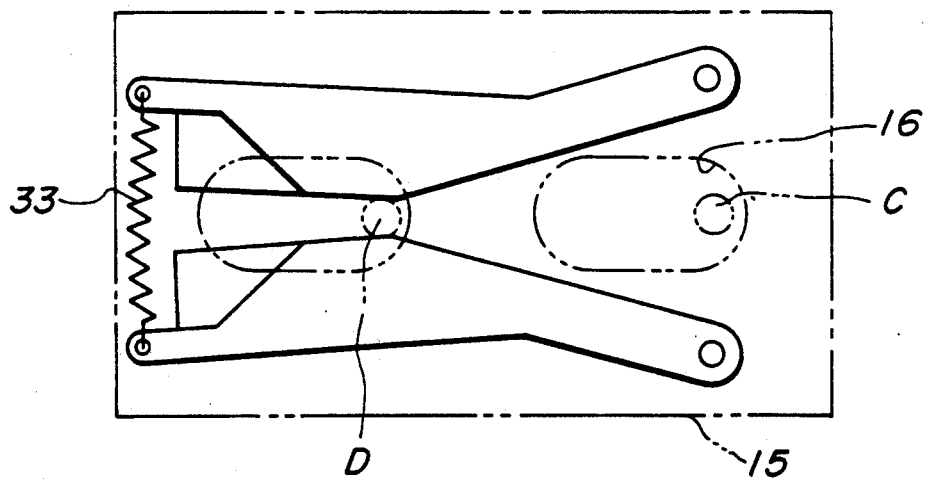
FIG. 9 is a plan view showing the shutter of FIG. 8 placed in an open position.

Referring to FIGS. 8 and 9, there is illustrated a second embodiment of the battery casing of the invention. This embodiment is substantially the same as the first embodiment of FIGS. 1 to 3 except for the shutter mechanism. Accordingly, like reference numerals have been applied to FIGS. 8 and 9 with respect to the equivalent components shown in FIGS. 1 to 3. The shutter mechanism, generally designated by the numeral 30 includes shutter elements 31 and 32 of the same configuration. The shutter element 31 has one end pivoted at 34A to the support plate 15. Similarly, the shutter element 32 has one end pivoted at 34B to the support plate 15. A coil spring 33 is trained between the other ends of the shutter elements 31 and 32 to hold the facing side surfaces of the shutter elements 31 and 32 in pressure contact with each other on a plane including a partition line 35, as shown in FIG. 8, so as to close the window 17 and open the window 16. The shutter elements 31 and 32 have recesses 31A and 32A which form a depression symmetric with respect to the partition line 35 when the shutter mechanism 30 is in its closed position. The recesses 31A and 32A have respective side walls 31B and 32B inclined at an acute angle with respect to the partition line 35.

The manner of attaching the battery casing on the video camera A is as follows: When the battery casing is separated from the video camera A, the shutter mechanism 30 is in its closed position where the shutter elements 31 and 32 are in pressure contact with each other to close the window 17, as shown in FIG. 8. First of all, the battery casing is placed on the flat surface B of the video camera A with its one side being coincided with the positioning line I drawn on the flat surface B of the video camera A. In this position, the positive terminal rod C extends through the window 16 and comes into pressure contact with the positive terminal plate 18 (FIG. 3) under the resilient force of the spring associated with the positive terminal rod C, whereas the negative terminal rod D extends through the window 17 and comes into pressure contact with the shutter elements 31 and 32 in the depression under the resilient force of the spring associated with the negative terminal rod D. The battery casing is then slid on the flat surface B of the video camera A to the right, as viewed in FIG. 10, between the upper and lower guide members E and F to place the projections G and H into engagement with the respective recesses 12 and 13 (FIG. 1). In the course of this sliding movement of the battery casing, the negative terminal rod D moves the shutter mechanism 30 to an open position, as shown in FIG. 9. That is, the negative terminal rod D moves between the side walls 31B and 32B of the respective shutter elements 31 and 32 to rotate the shutter element 31 about the pivot 34A in a clockwise direction, as viewed in FIG. 8, and the shutter element 31 about the pivot 34B in the counter-clockwise direction, as viewed in FIG. 8, against the resilient force of the coil spring 33 and it comes into pressure contact with the negative terminal plate 19 (FIG. 3) by the resilient force of the spring associated with the negative terminal rod D, as shown in FIG. 9.

According to the invention, the shutter mechanism covers at least one of the terminal plates to prevent any electric connection between the positive and negative terminal plates when the battery casing is removed or separated from the electric equipment. This is effective to avoid a waste of electric power and a dangerous heat generation.

While this invention has been described in conjunction with specific embodiments thereof, it is evident that many alternatives, modifications and variations will be apparent to those skilled in the art. For example, the shutter mechanism may be arranged to cover both of the positive and negative terminal plates. Accordingly, it is intended to embrace all alternatives, modifications and variations that fall within the scope of the appended claims.

What is claimed is:

1. A battery casing for attachment on an electric equipment having positive and negative terminal rods, said battery casing comprising:

positive and negative terminal plates exposed for connection to said respective terminal rods when said battery casing is attached on said electric equipment; and means for covering at least one of said terminal plates, said covering means operating in response to movement of the corresponding one of said terminal rods during the course of attachment of said battery casing on said electric equipment so as to uncover said one terminal plate to permit said one terminal rod to come into contact with said one terminal plate.

2. The battery casing as claimed in claim 1, wherein said covering means includes a pair of shutter elements, and resilient means for providing a resilient force to hold said shutter elements in contact with each other so as to cover said one terminal plate, the shutter elements having a channel guiding said one terminal rod to squeeze itself between said shutter elements during the course of attachment of said battery casing on said electric equipment.

3. The battery casing as claimed in claim 2, wherein said resilient means includes a U-shaped elastic connection having opposite ends connected to said respective shutter elements.

4. The battery casing as claimed in claim 2, wherein each of said shutter elements is pivoted at one end thereof, and wherein said resilient means includes a coil spring attached to the other end of each of said shutter elements.

5. A battery casing for attachment on electric apparatus having positive and negative terminal rods, said battery casing comprising:

positive and negative terminal plates exposed for connection to said respective terminal rods when said battery casing is attached on said electric apparatus; and means for covering at least one of said terminal plates, said covering means operable between a covering position wherein said at least one of said terminal plates is covered and an uncovering position wherein said at least one of said terminal plates is uncovered, said covering means alternating from said covering position to said uncovering position in response to movement of the corresponding one of said terminal rods during the course of attachment of said battery casing on said electric apparatus so as to uncover said terminal plate to permit said terminal rod to come into contact with said one terminal plate.

6. The battery casing as claimed in claim 5, wherein said covering means includes a pair of shutter elements, and resilient means for providing a resilient force to hold said shutter elements in contact with each other so as to cover said one terminal plate, the shutter elements having a channel guiding said one terminal rod to squeeze itself between said shutter elements during the course of attachment of said battery casing on said electric apparatus.

7. The battery casing as claimed in claim 6, wherein said resilient means includes a U-shaped elastic connection having opposite ends connected to said respective shutter elements.

8. The battery casing as claimed in claim 6, wherein each of said shutter elements is pivoted at one end thereof, and wherein said resilient means includes a coil spring attached to the other end of each of said shutter elements.

* * * * *